United States Patent [19]

Charlier

[11] Patent Number: 4,830,759

[45] Date of Patent: May 16, 1989

[54] DISPERSANT COMPOSITIONS FOR TREATING OIL SLICKS

[75] Inventor: Alain G. R. Charlier, Overijse, Belgium

[73] Assignee: Labofina, S.A., Brussels, Belgium

[21] Appl. No.: 77,151

[22] Filed: Jul. 24, 1987

[30] Foreign Application Priority Data

Jul. 24, 1986 [FR] France ................................. 86 10742

[51] Int. Cl.$^4$ .......................... E02B 15/04; C09K 3/32
[52] U.S. Cl. ..................................... 210/749; 210/925; 252/312; 252/354
[58] Field of Search ................ 252/312, 354; 210/925, 210/749

[56] References Cited

U.S. PATENT DOCUMENTS

| | | | |
|---|---|---|---|
| 3,332,486 | 7/1967 | McGhee | 166/274 |
| 3,415,745 | 12/1968 | Isaacson | 210/54 |
| 3,681,264 | 8/1972 | Prial | 252/526 |
| 3,793,218 | 2/1974 | Canevari | 252/312 |
| 3,810,835 | 5/1974 | Ferm | 210/59 |
| 3,900,421 | 8/1975 | Fusey | 252/312 |
| 4,110,213 | 8/1978 | Tennant et al. | 210/59 |
| 4,146,470 | 5/1979 | Mohan et al. | 210/2 |
| 4,152,290 | 5/1979 | Flournoy et al. | 252/355 |
| 4,162,989 | 7/1979 | Flournoy et al. | 252/312 |
| 4,230,562 | 10/1980 | Olivieri et al. | 210/610 |
| 4,452,737 | 6/1984 | Schmidt et al. | 260/192 |
| 4,462,910 | 7/1984 | Lepain et al. | 210/610 |
| 4,469,603 | 9/1984 | Lepain et al. | 252/312 X |
| 4,502,962 | 3/1985 | Becker et al. | 252/354 X |
| 4,512,914 | 4/1985 | Lepain et al. | 252/355 |
| 4,560,482 | 12/1985 | Canevari | 210/749 |
| 4,623,468 | 11/1986 | Lepain et al. | 210/749 |

FOREIGN PATENT DOCUMENTS

| | | |
|---|---|---|
| 60-60191 | 4/1985 | Japan ................................. 252/354 |
| 1255394 | 2/1969 | United Kingdom . |
| 1404684 | 4/1973 | United Kingdom . |

OTHER PUBLICATIONS

Griffin, article in *Journal of the Society of Cosmetic Chemists*, 1949, pp. 311–316 and 320–323.

Primary Examiner—Herbert B. Guynn
Attorney, Agent, or Firm—Mark A. Montgomery; John K. Abokhair; M. Norwood Cheairs

[57] ABSTRACT

Compositions for dispersing oil slicks on water comprising a solution of surface-active agents in a mixture of water and hydrocarbon solvent. The surface-active agents are a mixture of emulsifying agents and a lower amount of wetting agent. The mixture of emulsifying agents comprising two blends, A and B, of sorbitan derivatives, blend A having an HLB of about 8.5 to 9.5 and blend B having an HLB of about 8 to 10 wherein the weight ratio of blend A to blend B is between about 0.5:1 and 4:1.

22 Claims, No Drawings

DISPERSANT COMPOSITIONS FOR TREATING OIL SLICKS

BACKGROUND OF THE INVENTION

This invention relates to dispersant compositions for treating oil slicks on water.

Pollution of seawater by oil (crude oil or fractions of crude oil) occasioned by accidents, off-shore drilling operations, discharge of ballast water or spillage from oil tankers, results in the formation of a continuous film or slick of oil which tends to spread. This oily film is undesirable because it constitutes a barrier to the transfer of air and light from the atmosphere into the water, and without air and light the water cannot support marine life.

The more generally employed method for dealing with such pollution problems consists in treating the oil film with surface-active agents which disintegrate the cohesive oily film into droplets and disperse the droplets into the water column to a depth of several meters under the sea surface. The film is thus broken and there is again a transfer of air and light from the atmosphere to the water. Moreover, when oil is formed into droplets, digestion of the oil by the micro-organisms that live in seawater is much easier.

Some surface-active agents are highly effective as oil slicks dispersants, but they are very toxic towards aquatic flora and fauna and their use results in severe damage to marine life. On the otherhand, surface-active agents that have a lower degree of toxicity are often ineffective as oil dispersants in seawater. In fact, they are too quickly washed out by water with the result that the oil droplets coalesce, re-agglomerate and again form a slick.

Due to the problems noted above, highly effective surface-active agents are generally used in admixture with a solvent, particularly a solvent having a low degree of toxicity, such as paraffinic and cycloparaffinic hydrocarbons and lower alcohols. The use of a solvent presents many advantages: it decreases the pour point of the composition, it reduces the viscosity of the oil forming the slick, it acts as a diluent for the surface-active agent which is more readily and uniformly distributed into the oil slick, and it reduces the time required to mix the dispersant agent and the oil.

Another problem which arises from the use of surface-active agents as oil spill dispersants is their water-solubility. Some of these agents dissolve too quickly in water before they have time to penetrate the oil slick. For this reason, it has been suggested to use dispersant compositions containing at least two surface-active agents. Better dispersion results from the use of blends of surface-active agents whose proportions are selected so that the hydrophilic-lipophilic balance (or HLB) falls between defined limits.

The trend therefore is to use blends of surface-active agents in admixture with a solvent. British Patent No. 1,404,684 describes such a composition in which the oil slick dispersant comprises a blend of fatty acid polyoxyalkylene glycol esters and fatty acid sorbitan esters (HLB of the blend: from 9 to 10.5), dissolved in a hydrocarbon solvet containing less than 3 weight percent aromatics. The solution may contain from 5 to 50 weight percent of the surfactant blend, a proportion of 8 to 10 weight percent being particularly preferred. Other patents describe the use of compositions comprising a fatty acid sorbitan monoester and a polyalkylene oxide adduct of fatty acid sorbitan monoester (British Patent No. 1,255,394) or the use of these compounds in admixture with 25 to 35 volume percent (exclusive of solvent) of a 75% aqueous solution of dialkyl sulfosuccinate salt (U.S. Pat. No. 3,793,218). The best results in dispersing oil slicks were obtained from formulations containing 40 percent of a blend of surface-active agents and about 60 percent of an isoparaffinic hydrocarbon solvent.

However, problems may occur with dispersants containing a blend of surface-active agents and a solvent. The HLB of some compositions must fall within limits that are too narrow. Others require agitation, that means a rough sea, in order to achieve a disintegration of the oily film.

There is thus a need for improved dispersant compositions whose effectiveness is not appreciably affected by the above factors.

The object of this invention is to provide dispersant compositions for treating oil slicks on seawater that fulfill the following conditions:
have a high content of surface-active agents,
have a fast and long-lasting dispersion action,
be effective as well on calm sea (low energy mixing) as on rough sea,
exhibit an effectiveness which does not depend on a narrow critical HLB,
be a homogeneous limpid liquid, free from insoluble material.
have an adequate viscosity, allowing the composition to be sprayed from boats or from aicraft,
be non-toxic and biodegradable,
be easily manufactured and at low cost.

SUMMARY OF THE INVENTION

In accordance with the present invention, it has now been found that unexpected results in terms of oil-dispersing efficiency are achieved through the utilization of compositions which contain a mixture of surface-active agents in a mixture of water and hydrocarbon solvent, wherein the mixture of surface-active agents comprises:

about 35 to 45 weight percent of a water-dispensable dialkyl sulfosuccinate salt, such as sodium dioctylsulfosuccinate, as a wetting agent, said percentage being based on dry salt; and about 55 to 65 weight percent of emulsifying agents in a blend A of sorbitan monooleate and sorbitan monooleate polyoxyethylene adduct, said blend A having an HLB of about 8.75 to 9.5, and blend B of sorbitan trioleate and sorbitan monooleate polyoxyethylene adduct, said blend B having an HLB of about 8 to 10, the weight ratio of blend A to blend B being from about 0.5/1 to 4/1;

These compositions are very effective for dispersing oil slicks, as well on clam sea as on rought sea. Moreover, when comparing speed of oil slick dispersion after application of the composition on the oil slick, these compositions disperse oil slicks faster than prior compositions. These improvements result from a judicious selection of the components of the compositions and of their proportions, as disclosed herein.

The emulsifying agents are preferably made up in two separate blends, blend A and blend B, then added together along with at least one wetting agent, forming a mixture of surface-active agents. However, the emulsifying agents can be blended in any order so long as the concentrations are within the ranges disclosed herein and the overall HLB is between about 8.25 and 9.8.

DETAILED DESCRIPTION OF THE INVENTION

The compositions of the present invention contain emulsifying agents and at least one wetting agent as surface-active agents.

Emulsifying agents such as sorbitan monoesters of fatty acids, saturated or unsaturated, containing from 10 to 20 carbon atoms are the preferred agents in accordance with the present invention. The preferred sorbitan monoester, due to its effectiveness, availability, price, and purity is sorbitan monooleate.

The blend A of emulsifying agents comprises said sorbitan monooleate and sorbitan monooleate polyoxyethylene adduct, more particularly wherein the sorbitan monooleate polyoxyethylene adduct is the product resulting from the condensation, or graft, of about 20 moles of ethylene oxide on the monoester. The respective amounts of the components of blend A are such that the HLB of the mixture is from about 8.75 to 9.5. The HLB values of surface-active agents and the methods for calculating these values are given in the literature (see for instance: *Encyclopedia of Chemical Technology*, by Kirk-Othmer, 3rd edition, vol. 8, pp. 910–916). The HLB of sorbitan monooleate is 4.3 and the HLB of its polyoxyethylene adduct with 20 moles of ethylene oxide is 15. The HLB of a mixture of two components is calculated from the weight percentage and the HLB of each component. The dispersant effectiveness of the compositions of this invention largely depends upon the HLB of each blend A and B. According to a preferred embodiment of this invention, the HLB of the blend A of emulsifying agents will be between about 9 and 9.25.

The blend B of emulsifying agents comprises sorbitan trioleate (HLB=1.8) and sorbitan monooleate polyoxyethylene adduct with about 20 ethylene oxide units. The HLB of said blend can vary between about 8 and about 10. Particularly good results are obtained by using dispersant compositions of this invention wherein the blend B of emulsifying agents posses an HLB in the order of about 8.5 to 9.5.

The weight ratio of blend A to blend B can vary between wide limits but is preferably between about 0.5/1 and 4/1. The effectiveness of the compositions of this invention is particularly high, not only shortly after application of the composition on an oil slick but also a few hours after this application, when the weight ratio blend A/blend B is within the more preferred range of about 1.5/1 to 2.5/1.

The preferred wetting agent, due to its availability, price and effectiveness, is sodium dioctylsulfosucciante, more precisely sodium di(ethyl-2-hexyl)sulfosuccinate, which is generally available as a solution at 75% in a mixture of water and alcohol. To be more effective for dispersing oil slicks on calm seawater, the present compositions contain the wetting agent in such an amount that the weight ratio of emulsifying agents (blend A+blend B) to wetting agent is between about 65/35 and 55/45 preferably about 60/40.

The selection of the solvent is also an important feature. Indeed dispersant compositions are generally diluted by seawater, for instance 10 volumes of seawater for 1 volume of dispersant composition, before application by spraying from a boat. But the obtained emulsion is often unstable and a breaking of the emulsion occurs. The active phase, containing the emulsifying agent and the wetting agent, is separated by decantation, as its specific gravity is higher than the specific gravity of water. When applied on the oil slick, the active phase passes through the oil film, more particularly in the absence of strong agitation. Consequently, when sea is calm, the contact time between the oil and the active phase is too short and the active phase is not effective. To obviate this drawback, the compositions of this invention contain a solvent which is a mixture of water and hydrocarbon solvent with a low content in aromatic compounds, namely a dearomatized kerosene containing less than 3% by weight and, preferably, less than 1% by weight aromatic compounds.

The compositions of this invention generally contain at least about 50% by weight of surface active agents (emulsifying agents and wetting agent), the rest being a mixture of water and hydrocarbon solvent in practically the same weight percentage.

According to an embodiment of the present invention, the dispersant compositions comprise:

about 30 to 35% by weight of emulsifying agents in a blend A and a blend B, wherein the weight ratio of blend A to blend B is between about 1.5/1 and 2.5/1;

about 20% to 25% by weight of sodium dioctylsulfosuccinate wetting agent; wherein the balance of the composition comprises a solvent that is a mixture of water (40 to 50 wt. %) and dearomatized kerosene (60 to 50 wt. %).

The present invention will now be illustrated further by the following examples. These examples are illustrative of the present invention and not limitive of the reasonable scope thereof.

In these examples, reference is made to two test methods for determining the effectiveness of dispersant compositions: the method of Warren Spring Laboratory (Department of Trade and Industry, Stevenage, Hertfordshire) which is carried out under strong agitation, and the method of Institut Francais du Petrole (IFP), under low agitation.

In the Warren Spring Laboratory method (WSL method), the dispersant composition is added dropwise to a measured amount of oil floating on the surface of a column of seawater contained in a separating funnel. The funnel is then subjected to vertical rotation. The oil is dispersed by this strong agitation. The amount of oil dispersed into the water column is determined after allowing the water column to stand at rest for a period of time. The effectiveness of a composition is expressed in terms of the percentage of oil dispersed into the water phase (A specification for oil spill dispersants, Warren Spring Laboratory Report #LR 446-OP).

In the second method (IFP method), the test is carried out with dilution and with weak agitation produced by a beater acting on the water surface. The effectiveness of the dispersant composition is determined by the amount of oil swept along by a stream of water for a given period of time (Chemical oil dispersion in trials at sea and laboratory test: the keyrole of dilution processes; Symposium on oil spill dispersants, 1982, American Society for Testing Material).

In the examples, percentages are by weight.

EXAMPLE 1

A blend A of emulsifying agents having an HLB of 8.9 and containing 57 wt. % sorbitan monooleate and 43 wt. % sorbitan monooleate polyoxyethylene adduct with 20 moles ethylene oxide, was added to a blend B of emulsifying agents, having an HLB of 8.7 and containing 47.7 wt. % sorbitan trioleate and 52.3 wt. % sorbitan monooleate polyoxyethylene adduct with 20 moles ethylene oxide. The weight ratio of blend A to blend B was 1.9/1.

A dispersant composition was prepared with these emulsifying agents. The composition contained in weight percent:
30% blend A+blend B,
20% sodium dioctylsulfosuccinate (based on dry salt) or Na-DOSS,
25% dearomatized kerosene,
25% water.

The effectiveness of this composition was determined by using the IFP method, the tested oil being a topped (at 150° C.) Arabian crude oil. The dispersant composition was used in an amount of 0.2 milliliters for 5 milliliters of oil.

Two similar compositions were prepared and tested as above, except that the amount of sorbitan trioleate was replaced by:
the same amount of sorbitan trioleate polyoxyethylene adduct with 20 moles ethylene oxide (comparative composition 1), and
the same amount of sorbitan hexaoleate polyoxyethylene adduct with 20 moles ethylene oxide (comparative composition 2).

The results of the tests are given in Table 1.

TABLE 1

| Composition | Effectiveness (in % oil removed) after | | |
|---|---|---|---|
| | 30 minutes | 60 minutes | 120 minutes |
| Comp. of Example 1 | 72 | 85 | 88 |
| Comparative comp. 1 | 52 | 71 | 78 |
| Comparative comp. 2 | 51 | 70 | 78 |

EXAMPLE 2

Several compositions were prepared by using the components given in Example 1, but with different weight ratios of emulsifying agents (blend A+blend B) to wetting agent (Na-DOSS), without any modification of the percentage of water and hydrocarbon solvent.

In these compositions, the weight ratios emulsifying agents to wetting agent were respectively:
63/37
60/40
55/45
70/30
50/50

The effectiveness of each composition was determined after 60 minutes, using the IFP and the WSL methods. As in Example 1, the dispersant composition was used in an amount of 0.2 milliliters for 5 milliliters of oil (Arabian crude topped at 150° C.).

The results are given in Table 2.

TABLE 2

| Run # | Weight ratio emulsifying agents: wetting agent | Effectiveness (in % oil) after 60 minutes | |
|---|---|---|---|
| | | I.F.P. Method | WSL method |
| 1 | 63/37 | 78 | 90 |
| 2 | 60/40 | 85 | 87 |
| 3 | 55/45 | 76 | 78 |
| 4 | 70/30 (Comparative) | 25 | 60 |
| 5 | 50/50 (Comparative) | 40 | 55 |

These experiments show that advantageous results are obtained when the weight ratio of emulsifying agents to wetting agent is between about 65:35 and 55:45 and more particularly when this ratio is about 60:40.

EXAMPLE 3

A blend A having an HLB of 9.2 and containing 54.2 wt. % sorbitan monooleate and 45.8 wt. % sorbitan monooleate polyoxyethylene adduct with 20 moles ethylene oxide was added to a blend B having an HLB of 9.5 and containing 42.7 wt. % sorbitan trioleate and 58.3 wt. % sorbitan monooleate polyoxyethylene adduct with 20 moles ethylene oxide.

Several dispersant compositions were prepared with various amounts of blend A and blend B, the total amount of blend A+blend B being the same in each composition.

The compositions contained:
34% emulsifying agents (blend A+blend B),
23% Na-DOSS (dry salt),
22% dearomatized kerosene,
21% water.

The respective amounts of blends A and B and the effectiveness results (method IFP) are given in Table 3.

TABLE 3

| Compositions | Blend A | Blend B | Weight ratio blend A: blend B | Effectiveness (in % oil) after | | |
|---|---|---|---|---|---|---|
| | | | | 30 min. | 60 min. | 120 min. |
| A* | 34 | — | — | 50 | 74 | 80 |
| B* | 29.2 | 4.8 | 6:1 | 52 | 74 | 80 |
| C | 27.2 | 6.8 | 4:1 | 59 | 80 | 84 |
| D | 24.2 | 9.7 | 2.5:1 | 68 | 80 | 86 |
| E | 22.7 | 11.3 | 2:1 | 72 | 85 | 90 |
| F | 20.3 | 13.7 | 1.5:1 | 70 | 82 | 88 |
| G | 17 | 17 | 1:1 | 66 | 78 | 86 |
| H | 11.3 | 22 | 0.5:1 | 65 | 77 | 84 |
| I* | 3 | 31 | 0.1:1 | 53 | 73 | 74 |
| J* | — | 34 | — | 55 | 73 | 75 |

(*comparative compositions)

These results show that the effectivenss of the compositions is improved when the weight ratio of blend A to blend B is from about 0.5:1 to about 4:1.

EXAMPLE 4

A dispersant composition contained:
34% of a blend A, having an HLB of 9.2 and comprising the components described in Example 1, and a blend B, having an HLB of 8.5 and comprising the components described in Example 1, the weight ratio of blend A to blend B being 2:1,
22% of Na-DOSS (dry salt),
23% dearomatized kerosene,
21% water.

Comparative compositions were prepared by using blends B having also an HLB of 8.5 but containing:
composition K: 19.1 wt. % sorbitan monooleate+14.9 wt. % sorbitan monooleate polyoxyethylene adduct
composition L: 3.1 wt. % sorbitan triolate+8.2 wt. % sorbitan trioleate polyoxyethylene adduct
composition M: 16 wt. % sorbitan monooleate+7.1 wt. % sorbitan trioleate polyoxyethylene adduct The results of the effectiveness test (method IFP) are given in Table 4.

TABLE 4

| Composition minutes | Effectiveness (in %) after | | |
|---|---|---|---|
| | 30 minutes | 60 minutes | 120 |
| Comp. of Example 4 | 72 | 84 | 88 |

TABLE 4-continued

| Composition minutes | Effectiveness (in %) after | | |
|---|---|---|---|
| | 30 minutes | 60 minutes | 120 |
| Composition K | 15 | 27 | 30 |
| Composition L | 26 | 64 | 76 |
| Composition M | 20 | 32 | 52 |

These results clearly show that a dispersant composition wherein the blend B contains sorbitan trioleate and sorbitan monooleate polyoxyethylene adduct is more effective than compositions wherein the blend B contains other although similar components and even when the HLB is the same.

The effectiveness of the improved compositions of this invention results mainly from the selection of the emulsifying agents, their respective amounts and the weight ratio of total amount of emulsifying agents to the amount of wetting agent.

What is claimed is:

1. A composition for dispersing oil slicks on water comprising a mixture of surface-active agents dissolved in a solvent mixture of about 40 to 50 wt % water and about 50 to 60 wt % of a hydrocarbon solvent having a low content of aromatic compounds, wherein said mixture of surface-active agents comprises:
about 55 to 65 wt % emulsifying agents comprising:
 (a) a blend of sorbitan monooleate and sorbitan monooleate polyoxyethylene adduct, having an HLB of about 8.75 to 9.5, and
 (b) a blend of sorbitan trioleate and sorbitan monooleate polyoxyethylene adduct, having an HLB of about 8 to 10, wherein the weight ratio of the blend of (a) to the blend of (b) is within the range of about 0.5:1 and 4:1; and
about 35 to 45 wt % wetting agent comprising at least one surface-active water dispersable dialkylsulfosuccinate salt, said percentage being based on dry salt.

2. The composition according to claim 1, wherein the HLB of the blend of (a) is between about 9 and 9.25 and the HLB of the blend of (b) is between 8.5 and 9.5.

3. The composition according to claim 1, wherein the weight ratio of the blend of (a) to the blend of (b) is between about 1.5:1 and 2.5:1.

4. The composition according to claim 1, wherein said wetting aent is sodium di(ethyl-2-hexyl)sulfosuccinate.

5. The composition according to claim 1, wherein said sorbitan monooleate polyoxyethylene adduct in (a) and (b) contains about 20 moles of ethylene oxide.

6. The composition according to claim 1 wherein the composition consists essentially of said solvent mixture and said surface-active agents.

7. The composition according to claim 1, wherein the amount of said surface-active agents dissolved in said solvent mixture is at least about 50 wt. % based on the total composition.

8. The composition according to claim 7, wherein the composition comprises about 30 to 35 wt % emulsifying agents and about 20 to 25 wt % wetting agent, with the remainder of the composition being a solvent mixture of about 40 to 50 wt % water, and about 50 to 60 wt % dearomatized kerosene.

9. A composition for dispersing oil slicks on water comprising:
about 30 to 35 wt % emulsifying agents with the remainder of the composition being a solvent mixture comprised of:
 (a) a blend of sorbitan monooleate and sorbitan monooleate polyoxyethylene adduct having an HLB of about 8.75 to 9.5, and
 (b) a blend of sorbitan trioleate and sorbitan monooleate polyoxyethylene adduct having an HLB from about 8 to 10, wherein the weight ratio of the blend of (a) to the blend of (b) is between 0.5:1 and 4:1;
about 20 to 25 wt % wetting agent comprised of sodium dioctylsulfosuccinate, said percentage being based on dry salt; and
the balance of the composition being a solvent mixture comprised of about 40 to 50 wt % water, and about 50 to 60 wt % of dearomatized kerosene.

10. The composition according to claim 9, wherein the HLB of the blend of (a) is between about 9 and 9.25 and the HLB of the blend of (b) is between 8.5 and 9.5.

11. The composition according to claim 9, wherein the weight ratio of the blend of (a) to the blend of (b) is between about 1.5:1 and 2.5:1.

12. The composition according to claim 9, wherein said sorbitan monooleate polyoxyethylene adduct in (a) and (b) contains about 20 moles of ethylene oxide.

13. A composition for dispersing oil slicks on water comprising a mixture of surface-active agents dissolved in a solvent mixture of about 40 to 50 wt % water and about 50 to 60 wt % of a hydrocarbon solvent having a low content of aromatic compounds, wherein said mixture of surface-active agents comprises:
about 35 to 45 wt % wetting agent comprising at least one surface-active water dispersable dialkylsulfosuccinate salt, said percentage being based on dry salt; and
about 55 to 65 wt % emulsifying agents comprising a blend of sorbitan monooleate, sorbitan trioleate, and sorbitan monooleate polyethylene adduct, having an HLB of about 8.25 to 9.8, wherein the concentration ranges of the three emulsifying agents in said blend are such that they fall within the parameters of a blend of blend A and blend B wherein blend A comprises sorbitan monooleate and sorbitan monooleate polyoxyethylene adduct, having an HLB of about 8.75 to 9.5, and blend B comprises sorbitan trioleate and sorbitan monooleate polyoxyethylene adduct, having an HLB of about 8 to 10, wherein the weight ratio of blend A to blend B is within the range of about 0.5:1 and 4:1.

14. A composition according to claim 13, wherein the HLB of blend A is between 9 and 9.25, the HLB of blend B is between 8.5 and 9.5, the weight ratio of blend A to blend B is between about 1.5:1 and 2.5:1, said wetting agent is sodium di(ethyl-2-hexyl)sulfosuccinate, and said sorbitan monooleate polyoxyethylene adduct contains about 20 moles of ethylene oxide.

15. The composition according to claim 13, wherein the composition comprises about 30 to 35 wt % emulsifying agents and about 20 to 25 wt % wetting agent, with the remainder of the composition being a solvent mixture of about 40 to 50 wt % water, and about 50 to 60 wt % dearomatized kerosene.

16. A method for dispersing oil slicks on water comprising:
applying an an oil slick the composition comprising a mixture of surface-active agents dissolved in a solvent mixture of about 40 to 50 wt % water and about 50 to 60 wt % of a hydrocarbon solvent having a low content of aromatic compounds, wherein said mixture of surface-active agents comprises:

about 55 to 65 wt % of the emulsifying agents comprising:
 (a) a blend of sorbitan monooleate and sorbitan monooleate polyoxyethylene adduct, having an HLB of about 8.75 to 9.5, and
 (b) a blend of sorbitan trioleate and sorbitan monooleate polyoxyethylene adduct, having an HLB of about 8 to 10 wherein the weight ratio of the blend of (a) to the blend of (b) is within the range of about 0.5:1 and 4:1; and
about 35 to 45 wt % wetting agent comprising at least one surface-active water dispersable dialkylsulfosuccinate salt, said percentage being based on dry salt.

17. The method according to claim 16, wherein the HLB of the blend of (a) is between about 9 and 9.25 and the HLB of the blend of a (b) is between 8.5 and 9.5.

18. The method according to claim 16, wherein the weight ratio of the blend of (a) to the blend of (b) is between about 1.5:1 and 2.5:1.

19. The method according to claim 16, wherein said wetting agent is sodium di(ethyl-2-hexyl)sulfosuccinate.

20. The method according to claim 16, wherein said sorbitan monooleate polyoxyethylene adduct in (a) and (b) contains about 20 moles of ethylene oxide.

21. The method according to claim 16, wherein the amount of said surface-active agents dissolved in said solvent mixture is at least about 50 wt % based on the total composition.

22. The method according to claim 21, wherein the composition comprises about 30 to 35 wt % emulsifying agents and about 20 to 25 wt % wetting agent with the remainder of the composition being a solvent mixture of about 40 to 50 wt % water, and about 50 to 60 wt % dearomatized kerosene.

* * * * *